(No Model.)

I. M. ALLEN & J. M. MILLER.
VEHICLE RUNNING GEAR.

No. 568,889. Patented Oct. 6, 1896.

Witnesses
F. L. Ourand
M. J. Johnson

Isaac M. Allen
and John M. Miller
Inventors,
By W. T. FitzGerald & Co.,
Attorneys.

UNITED STATES PATENT OFFICE.

ISAAC M. ALLEN AND JOHN M. MILLER, OF HARRISBURG, ILLINOIS.

VEHICLE RUNNING-GEAR.

SPECIFICATION forming part of Letters Patent No. 568,889, dated October 6, 1896.

Application filed June 16, 1896. Serial No. 595,775. (No model.)

*To all whom it may concern:*

Be it known that we, ISAAC M. ALLEN and JOHN M. MILLER, citizens of the United States, residing at Harrisburg, in the county of Saline and State of Illinois, have invented certain new and useful Improvements in Vehicles; and we do hereby declare the following to be a full, clear, and exact description of the invention, such as will enable others skilled in the art to which it appertains to make and use the same.

Our invention relates to the running-gears of vehicles, comprising all manner of wagons, buggies, &c., which may properly come under said term "vehicles," reaching from the clumsiest and most heavily constructed freighting or lugging wagon to the delicately-built buggy or pleasure-vehicle.

Our invention relates particularly to certain features of construction applied to the "reach" or coupling-pole of a vehicle, the object being to provide against damages resulting to said reach from violent torsion following the passage of the wheels over uneven surfaces.

A further advantage resulting from the use of our invention arises from the fact that we provide not only against the damaging effect resulting from the twisting of the coupling-pole, but also against the wear of said pole by contacting with the forward hounds or fifth-wheel, or the abrasion resulting from contact with the forward wheels when the vehicle is turned within a small area.

The construction and operation of our invention will be fully set forth in the following specification and the accompanying drawings, in which—

Figure 2:
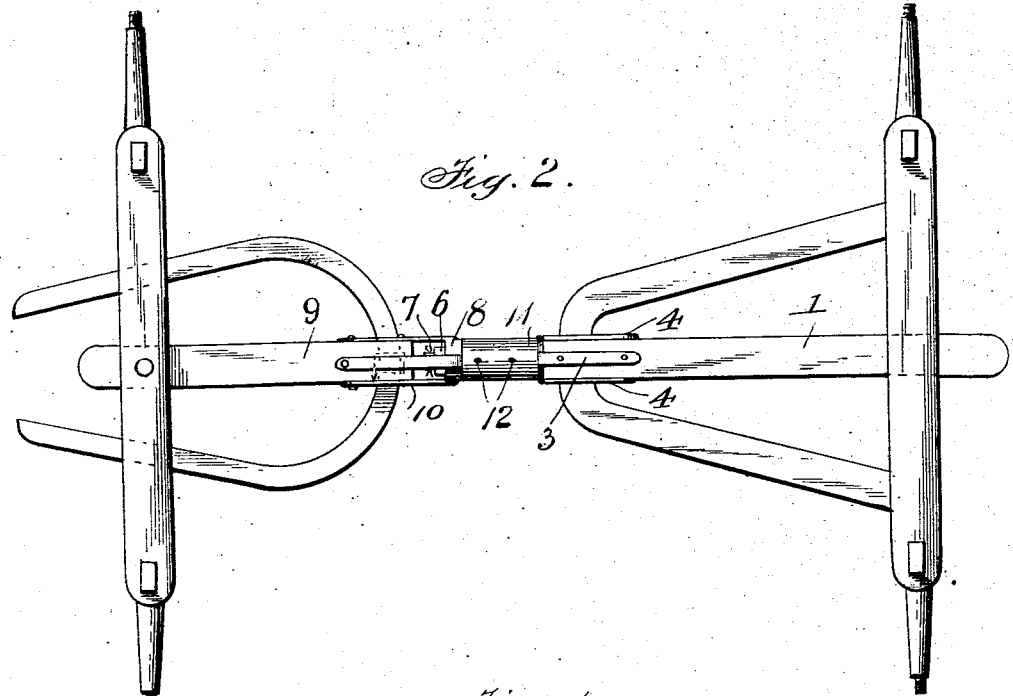
Figure 1:
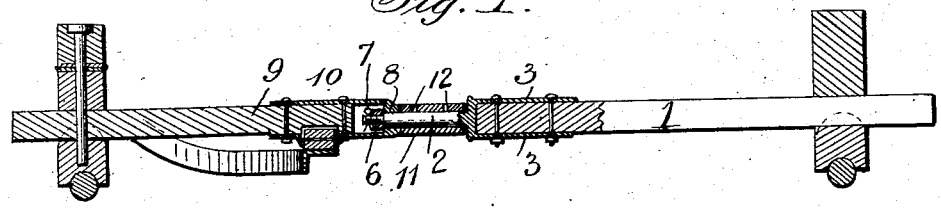
Figure 3:
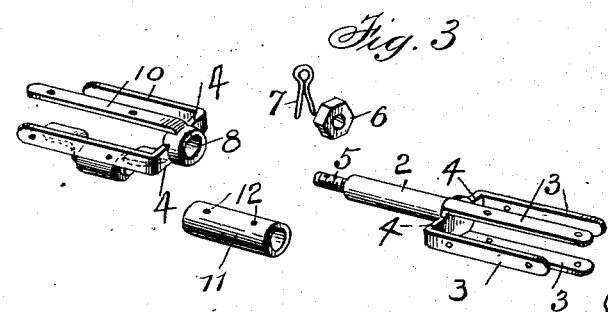
Figure 4:
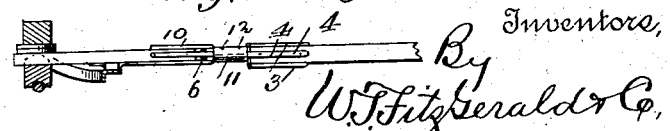

Figure 1 is a longtitudinal section of our invention applied to use. Fig. 2 is a top plan view. Fig. 3 shows the several elements of our invention separated from each other and ready to be assembled in their respective operative positions. Fig. 4 shows one of the arms provided with a bearing-roller when it is desired to use said roller in lieu of the roller provided by the antitorsion device.

In setting forth our invention reference will be had to the various details by figures of reference, each figure referring to the same part throughout the several views. In carrying out our invention a coupling-pole or reach is provided of the usual construction which is separated into two parts of the relative lengths substantially as shown, though this point of division is not absolutely material.

To the forward end of the rear section 1 of the reach is secured the journal 2, preferably by means of the parallel arms 3, which in turn are connected to the journal by the lateral arms 4. The free or forward end of the journal is preferably provided with the screw-threaded terminal 5, as shown, which is adapted to receive the nut 6. Said nut may be additionally reinforced or secured when turned home on the screw-threaded end 5 by means of the securing-pin 7, which takes through a transverse aperture provided in the end of the journal outside of the nut when the latter is in its operative position.

Before the nut 6 is turned home the end of the journal is arranged to reach through the collar 8, secured to the rear end section 9 of the coupling-pole by means of the arms 10. In order to provide for reducing to the minimum the friction arising from the contact of the fifth-wheel with the coupling-pole or the friction arising from the contact of the forward wheels, we mount upon the journal 2 the sleeve 11, which is provided with a bore of sufficient diameter to admit of its being freely rotated upon said journal. Apertures 12 may be provided in the sleeve for the admission of oil or other lubricant, thus providing for the free rotation of the sleeve. We prefer to so construct the journal and the sleeve carried thereon that they will be of sufficient length to extend from the point of contact of the coupling-pole with the fifth-wheel rearwardly to the point of contact with the wheels of the vehicle when the same are turned, thus providing an antifrictional device for both the parts above named.

When it is desired (in cases where a neater appearance is desirable) to provide an independent antifrictional device for contact with the fifth-wheel, a separate frictional roller may be carried by one of the arms 10, as shown in Fig. 4, which is so formed that it will pass through a friction-roller and admit the same being rotated, as will be readily understood.

From the foregoing it will be clearly apparent that we have provided an antifrictional device having a threefold function, that is to say, first, provision is made to admit of the wheels of the vehicle passing over uneven surfaces without the usual resultant twisting and breaking of the coupling-pole, the king-bolt, or other part of the running-gears; secondly, an antifrictional device is provided for protecting the coupling-pole from contact with the wheels of the vehicle, and, thirdly, an antifrictional device is provided for contact with the fifth-wheel of the vehicle. In operation it will be understood that when one of the wheels passes over an obstruction, thus raising it high above the other wheels, the journal 2 will freely rotate in the collar 8, thus neutralizing the strain, which would otherwise result in breaking the coupling-pole.

Believing that the advantages, construction, and operation of our invention will be clearly apparent from the foregoing specification, further reference thereto will be unnecessary; and,

Having thus described our invention, what we claim as new, and desire to secure by Letters Patent, is—

1. An attachment for vehicles consisting of the journal connected fixedly to one of the ends of the coupling-sections, and yieldingly to the opposite end of the other section of said coupling and carrying thereon a rotatable sleeve substantially as described.

2. The combination with the running-gears of a vehicle, of the herein-described antifrictional device consisting of the journal; a collar adapted to receive said journal and admit of the rotation thereof, and a sleeve loosely mounted upon said journal, substantially as described and for the purpose named.

3. The herein-described antifrictional device consisting of the two sections of the coupling-pole, means for connecting said sections in such a manner that each may rotate independently of the other, and a sleeve mounted upon said connecting device, and adapted to rotate thereon, substantially as described and for the purpose named.

4. An attachment for coupling-poles consisting of the journal; means for connecting said journal to the other section of the coupling-pole; a sleeve mounted upon the journal; in combination with an antifrictional roller attached to said collar, and held in contact with the fifth-wheel of the vehicle, substantially as described and for the purpose named.

In testimony whereof we affix our signatures in presence of two witnesses.

ISAAC M. ALLEN.
JOHN M. MILLER.

Witnesses:
CHAS. J. OZMENT,
L. W. ABNEY.